United States Patent
Baudou et al.

(10) Patent No.: US 12,147,050 B2
(45) Date of Patent: Nov. 19, 2024

(54) HELMET DISPLAY SYSTEM COMPRISING A REMOVABLE HELMET-MOUNTED DISPLAY COMPATIBLE WITH THE USE OF BINOCULARS

(71) Applicant: THALES, Courbevoie (FR)

(72) Inventors: Joël Baudou, Merignac (FR); Bruno Aymeric, Merignac (FR)

(73) Assignee: THALES, Courbevoie (FR)

( * ) Notice: Subject to any disclaimer, the term of this patent is extended or adjusted under 35 U.S.C. 154(b) by 630 days.

(21) Appl. No.: 17/423,917

(22) PCT Filed: Dec. 18, 2019

(86) PCT No.: PCT/EP2019/086057
§ 371 (c)(1),
(2) Date: Jul. 19, 2021

(87) PCT Pub. No.: WO2020/160827
PCT Pub. Date: Aug. 13, 2020

(65) Prior Publication Data
US 2022/0128823 A1    Apr. 28, 2022

(30) Foreign Application Priority Data
Feb. 7, 2019 (FR) ..................................... 1901166

(51) Int. Cl.
*G02B 27/01* (2006.01)
*G02B 27/00* (2006.01)

(52) U.S. Cl.
CPC ..... *G02B 27/0176* (2013.01); *G02B 27/0093* (2013.01); *G02B 27/0172* (2013.01);
(Continued)

(58) Field of Classification Search
CPC ................ G02B 27/01; G02B 27/0172; G02B 27/0176; G02B 27/0018; G02B 27/0093;
(Continued)

(56) References Cited

U.S. PATENT DOCUMENTS

| 5,187,502 A * | 2/1993 | Howell .................. A42B 3/185 351/44 |
| 9,638,920 B2 * | 5/2017 | Bohn .................. G02B 27/0176 |

(Continued)

FOREIGN PATENT DOCUMENTS

| WO | 01/21022 A1 | 3/2001 |
| WO | 2010/045141 A1 | 4/2010 |

OTHER PUBLICATIONS

Cameron, et al., "Optical waveguide technology and its application in head-mounted displays", Proceedings vol. 8383, Head- and Helmet-Mounted Displays XVII; and Display Technologies and Applications for Defense, Security, and Avionics VI; vol. 8383, No. 1, pp. 1-11, 2012.

(Continued)

*Primary Examiner* — Sultan Chowdhury
(74) *Attorney, Agent, or Firm* — Baker Hostetler

(57) ABSTRACT

A modular helmet display system includes at least one helmet shell, binoculars and a display device. The helmet shell includes a mechanical arch fixedly mounted on the front part of the helmet, and the mechanical arch includes at least one first device for attaching the binoculars. In the system, the mechanical arch includes a second device for attaching the display device. The display device may include a posture detection device and an adjustment mechanism. The display system may include a mechanical cover which is mounted in place of the display device, the shape of the
(Continued)

cover being adapted so as to hide the upper part of the helmet. A mobile visor can be mounted on the mechanical arch.

11 Claims, 4 Drawing Sheets

(52) U.S. Cl.
CPC ............... *G02B 2027/0132* (2013.01); *G02B 2027/0138* (2013.01)

(58) Field of Classification Search
CPC .... G02B 2027/0132; G02B 2027/0138; G02B 2027/0178; G02B 2027/0196; G02B 23/00; G02B 23/14; G02B 23/16; G02B 23/18; G02B 23/20; G02B 23/125
See application file for complete search history.

(56) References Cited

U.S. PATENT DOCUMENTS

| | | | |
|---|---|---|---|
| 2005/0167590 A1* | 8/2005 | Miyano | G02B 23/125 250/330 |
| 2010/0132085 A1* | 6/2010 | Beaudet | A42B 3/221 2/6.5 |
| 2012/0120482 A1 | 5/2012 | Hedges et al. | |
| 2013/0086722 A1* | 4/2013 | Teetzel | A42B 3/04 2/2.5 |
| 2014/0327962 A1* | 11/2014 | Teetzel | G02B 23/125 359/409 |
| 2017/0123451 A1* | 5/2017 | Baudou | H04R 1/028 |

OTHER PUBLICATIONS

Atac, et al., "Scorpion hybrid optical-based inertial tracker (HObIT) test results", Proceedings of the SPIE, vol. 9086, pp. 1-10, 2014.

\* cited by examiner

HELMET DISPLAY SYSTEM COMPRISING A REMOVABLE HELMET-MOUNTED DISPLAY COMPATIBLE WITH THE USE OF BINOCULARS

CROSS-REFERENCE TO RELATED APPLICATIONS

This application is a National Stage of International patent application PCT/EP2019/086057, filed on Dec. 18, 2019, which claims priority to foreign French patent application No. FR 1901166, filed on Feb. 7, 2019, the disclosures of which are incorporated by reference in their entirety.

FIELD OF THE INVENTION

The technical field of the invention is that of helmet-mounted display systems for aircraft pilots. More precisely, the field of the invention is that of systems combining both binoculars and a viewfinder or a helmet-mounted display.

BACKGROUND

A pilot's helmet may comprise three different viewing devices. These are a protective visor, a viewfinder or a helmet-mounted display and night-vision binoculars. Throughout the rest of the description, the term helmet-mounted display will refer equally to a helmet-mounted viewfinder or to a helmet-mounted display. The binoculars may be day-vision binoculars or night-vision binoculars. They are then known by the acronym "NVBs" for "night-vision binoculars".

Night-vision binoculars capture the luminosity of objects in the near-infrared and render an image visible using light-intensification devices. They comprise two identical bodies. Each of the bodies comprises three main parts which are a lens, the light-intensifier device and an eyepiece. The visual field of NVBs given by the eyepiece is generally 40 degrees in diameter. To see the entirety of the intensified image, the eyepiece of the NVBs is generally positioned about 25 millimeters away from the eye.

A helmet-mounted display presents a synthetic or video image at infinity overlaid over the outside by means of a projection optic and an optical combiner or mixer. The combiner may be integrated into the helmet's visor. It may also be integrated into the helmet-mounted display. To decrease the dimensions of this element, pupil-expansion combiners are used. The combiner is then an optical plate made up of a plurality of prisms reflecting the light of the synthetic image toward the eye.

The display device is necessarily associated with a posture detection device. This has a number of uses. It allows the image displayed by the display device to be adjusted. It makes it possible to control a certain number of systems on board the aircraft, such as certain imaging sensors or certain weapon systems.

One of the difficulties with this type of display system is that it has to be modular. Depending on the aircraft's missions, the user has to be able to use the helmet in the following configurations:
 helmet and visor;
 helmet, visor and display device;
 helmet, visor and binoculars;
 helmet, visor, display device and binoculars.

Modularity has to be obtained without having to perform complex assembly and disassembly operations. It has to be possible regardless of the size of the helmet and morphological differences between users. Furthermore, the required adjustments to the display device that make it possible to compensate for morphological differences and to ensure harmonization with the posture detection device have to be maintained, if possible.

A modular system is presented in patent US 2012/0120482 entitled "Modular day mode/night mode helmet-mounted display" which allows the simultaneous use of a display device and binoculars by virtue of a display device with a thin pupil-expansion combiner, this combiner being positioned between the eye and the NVBs, as close as possible to the eyepiece.

During the day, a visor module is placed on the helmet and, at night, the visor module is replaced with the NVBs. The helmet consists of a flight helmet with the visor removed and receptacles for the display module are added.

The main drawback of this principle is the complexity in switching from daytime mode to night-time mode with the need to temporarily store two modules in the cockpit. This storage requires having locations close to the pilot, which is rarely the case in light aircraft or helicopter cockpits.

Another drawback is due to the lateral tilt of the display device in order to allow the binoculars to be mounted. This tilt of the display device does not allow the whole of the available field to be used because the image has to be resized so as not to disrupt the pilot's view and interpretation with inclined contours of the synthetic image.

SUMMARY OF THE INVENTION

The helmet-mounted display system according to the invention does not have the above disadvantages. It comprises a unique rigid structure that can be adapted to different helmet sizes. Various attachment members are mounted on this structure which make it possible to mount the visor, the binoculars and the display device associated with its position detection. The various adapting adjustments are arranged on the binoculars and the display device. The shell of the helmet is therefore completely standardized. Only the display systems are individualized.

More specifically, the invention relates to a modular helmet-mounted display system comprising at least one helmet shell, binoculars and a display device, the helmet shell comprising a mechanical arch securely mounted on the frontal part of said helmet, said mechanical arch comprising at least a first device for attaching the binoculars, characterized in that said arch comprises a second device for attaching the display device.

Advantageously, the display device comprises a posture detection device.

Advantageously, the posture detection device comprises a camera.

Advantageously, the display device comprises position adjustments in two perpendicular planes so as to adjust the distance separating the pupil of the display device from the vertex of the helmet and the interpupillary distance.

Advantageously, the display device comprises a flat pupil-expansion optical combiner so that the display device and the binoculars may be mounted simultaneously on the helmet, the optical combiner being placed flat in front of one of the two eyepieces of the binoculars.

Advantageously, the display system comprises a mechanical cover which is mounted in place of the display device when the latter is not mounted on the mechanical arch, the shape of the cover being designed so as to hide the upper part of the helmet.

Advantageously, the second attachment device comprises a slide in the shape of a dovetail.

Advantageously, the display system comprises a movable visor mounted on the mechanical arch.

Advantageously, the movable visor comprises two axes of rotation situated symmetrically on either side of the mechanical arch and at the height of the user's forehead, said visor having the following two main positions:
- a down position of use, applied when the binoculars are not mounted in their holder, and in this down position, the visor covers the display device and its combiner;
- an up position of use, applied when the binoculars are mounted in their holder, and in this up position, the visor is situated on top of the helmet.

Advantageously, the mechanical arch is attached to the helmet by means of two attachment assemblies situated symmetrically on either side of the helmet, each attachment assembly comprising a spacer the thickness of which is matched to the size of the helmet, the mechanical arch being of one size.

DETAILED DESCRIPTION

Figure 1:
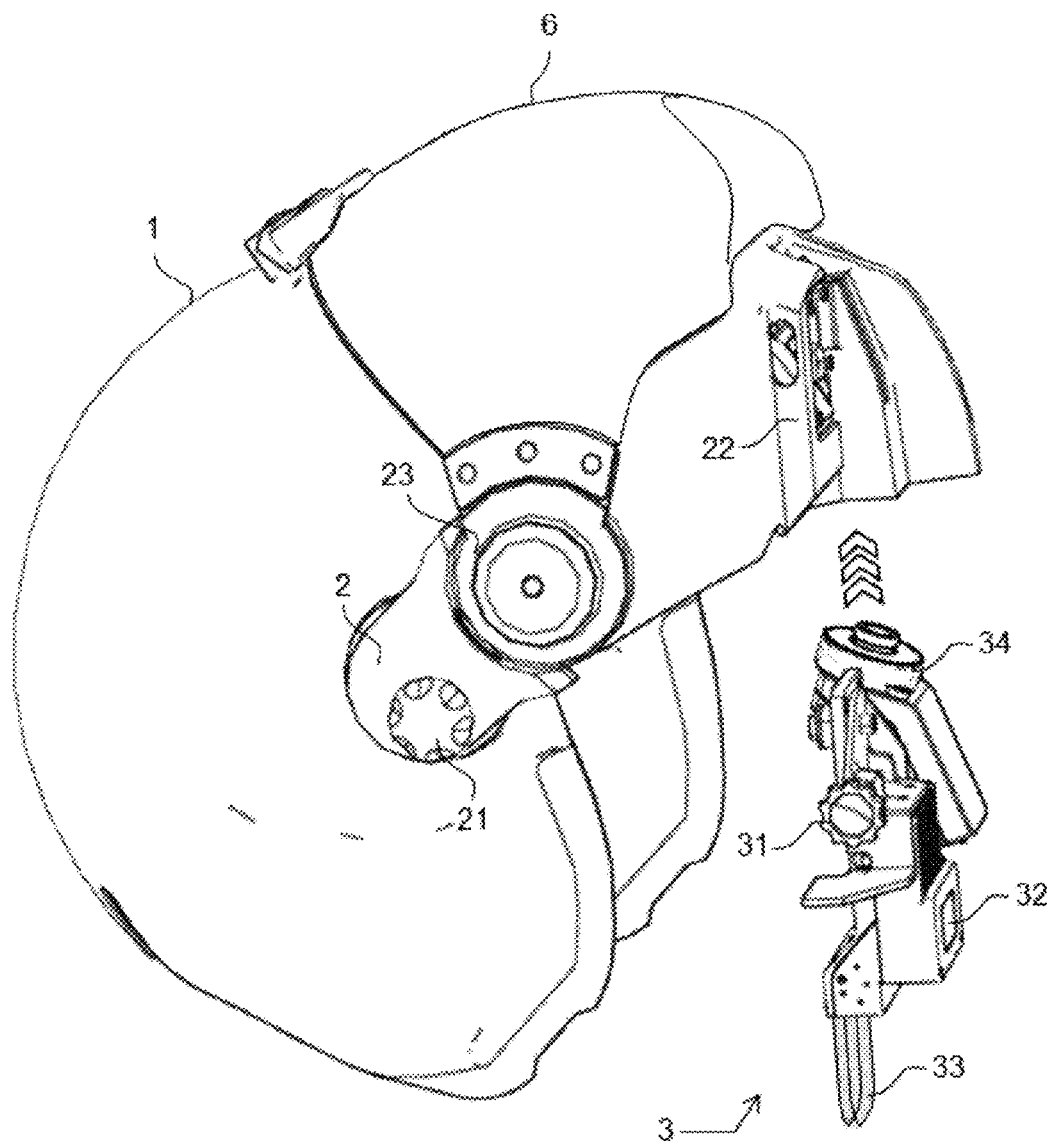
FIG. 1 shows a side view of the display system according to the invention with its display device.

The modular display system according to the invention essentially comprises a helmet shell 1, a mechanical arch 2 mounted on the frontal part of this shell 1, a raisable visor 6, a display device 3, a cover 4 and a pair of binoculars 5. By way of example, FIG. 1 shows a side view of the shell 1, of the mechanical arch 2, of the visor 6 and of the display device 3.

The general shape of this arch 2 is a circular arc reinforced by side members and an upper cap. These latter elements are not visible in FIGS. 1, 2 and 3.

Figure 2:
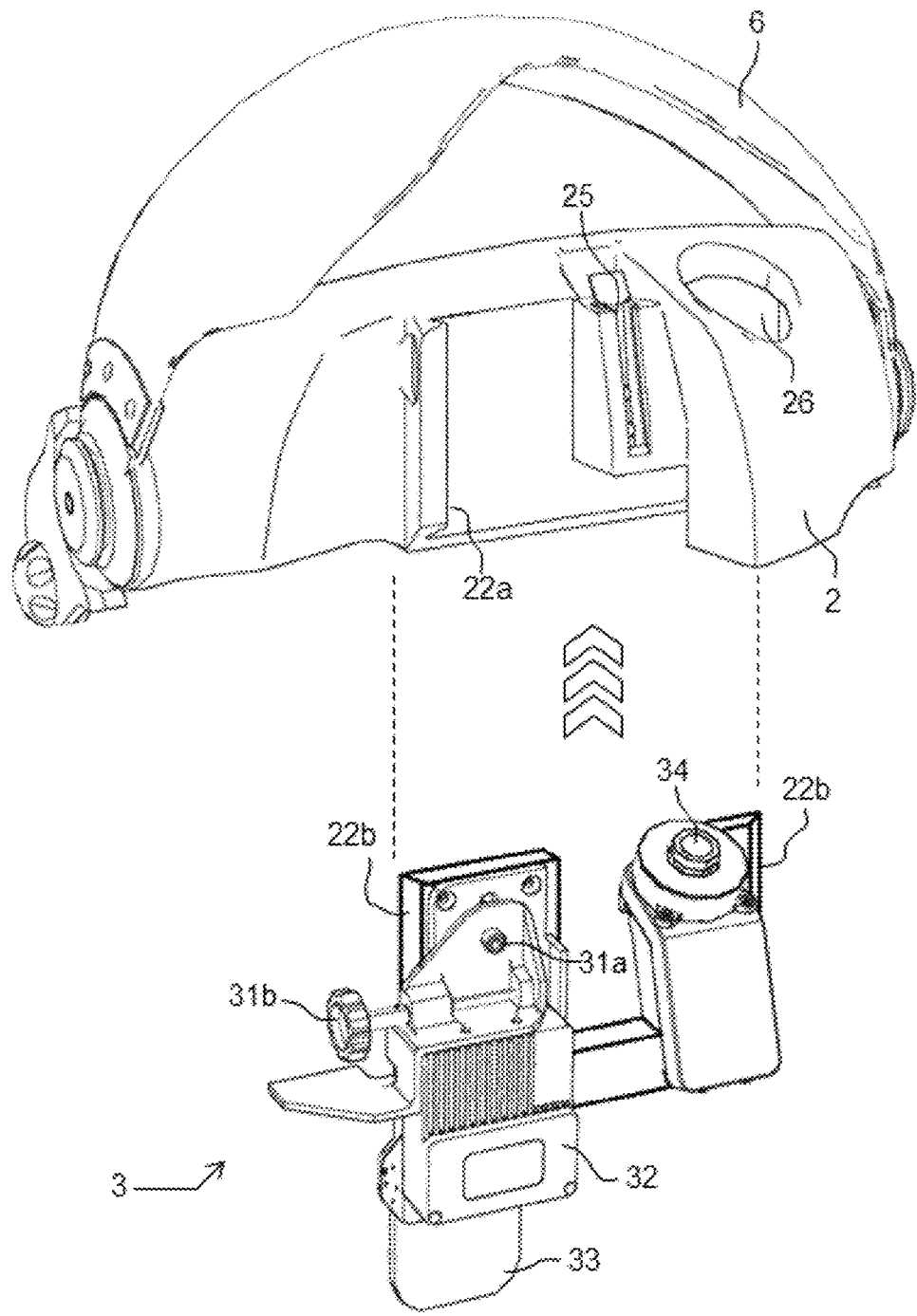
FIG. 2 shows a front view of the mechanical arch and of the associated display device according to the invention.
Figure 3:
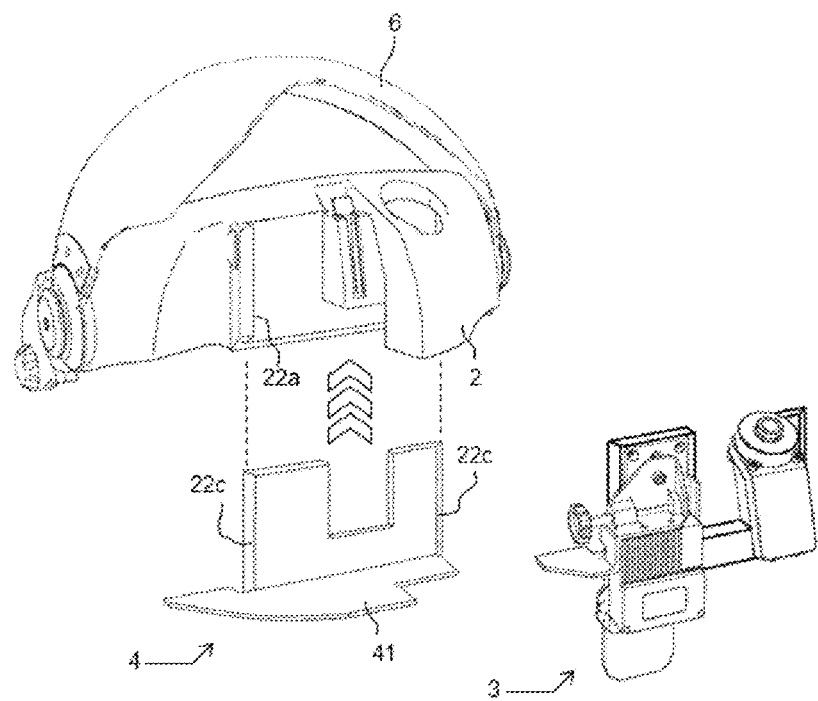
FIG. 3 shows a front view of the mechanical arch, of the display device and of the associated cover according to the invention.

As can be seen in FIGS. 1, 2 and 3, this arch 2 comprises the following elements:
- means 21 for attachment to the shell of the helmet;
- a movable visor 6;
- means 23 for attaching and hinging the movable visor 16;
- a first device 25 for attaching binoculars;
- a second device 22 for attaching the display device;
- the various electrical connections required to supply the display device
- and/or the binoculars with power.

The two means 21 for attachment to the shell of the helmet are situated at both ends of the arch as can be seen in FIGS. 1, 2 and 3.

The two means 23 for attaching and hinging the movable visor 6 are located a few centimeters away from, above and in front of the attachment means 21. The visor 6 is rotatable about its axes. The movable visor performs a dual visual and mechanical protection function.

The movable visor 6 is conventionally curved in shape. It has a mechanical and optical protection function. It may be tinted so as to form a sun or antilaser visor. If the helmet is an adapted standard helmet, it is advantageous to use the helmet's initial visor by relocating it to a position other than its initial position. This avoids the costs of developing and purchasing a specific visor.

The visor has two main positions which are:
- a down position of use, applied when the binoculars are not mounted in their holder, and in this down position, the visor covers the display device and its combiner;
- an up position of use, applied when the binoculars are mounted in their holder, and in this up position, the visor is situated on top of the helmet.

The arch comprises a first device 25 for attaching binoculars. This first attachment means may be a T-shaped groove made in the mechanical structure of the arch. Other arrangements are possible.

The arch also comprises a second device 22 for attaching the display device.

By way of example, the second attachment device comprises a slide in the shape of a dovetail. In FIGS. 2 and 3, the left-hand part of the groove 22a of the dovetail is visible on the mechanical arch 2. In these same figures, the tenon 22b of the dovetail arranged on the display device is also visible.

The display device comprises an optical assembly, the posture detection device 34 and adjustment means 31. The optical assembly comprises three main parts which are a display device 32, a collimating optic and an optical combiner 33.

By way of example, the display device 32 comprises a flat screen with its light source and its driver circuit board. The projection optic collimates the diffused image. The combiner 33 overlays this image over the outside landscape. It is generally a pupil-expansion combiner.

A pupil-expansion combiner is a thin optical plate with planar and parallel faces into which is inserted a plurality of half-silvered mirrors which are inclined and parallel to one another. The thickness of the combiner is a few millimeters. By virtue of this arrangement, it is possible to obtain, in a compact manner, a pupil with dimensions sufficient for viewing. The distance separating the combiner from the eye is of the order of 25 millimeters.

The position detection device 34 has a number of uses. It allows the image displayed by the display device to be adjusted. It makes it possible to control a certain number of systems on board the aircraft, such as certain imaging sensors or certain weapon systems.

By way of example, this device is a wide-field, high-resolution microcamera which detects specific test patterns arranged at known locations in the cockpit. The position and orientation of these test patterns in the image make it possible to determine the position and orientation of the camera and, consequently, of the helmet on which the camera is mounted. Of course, the display system according to the invention is not limited just to this type of position detection.

It is essential that the mechanical connection between this detection device and the display device be as rigid as possible so that the position of the helmet determined by the camera is always representative of the position of the display device. As can be seen in FIGS. 2 and 3, the display device and the camera are mounted on a single rigid U-shaped structure. The arms of the U surround the device for attaching the binoculars when the display device is mounted on the arch 2. This structure comprises the tenon 22b of the dovetail.

As can be seen in FIGS. 2 and 3, this detection device may be fitted inside the mechanical arch which then comprises an opening 26 that opens out so that the camera is not obscured.

The display device also comprises means 31 for position adjustments in two perpendicular planes so as to adjust the distance separating the pupil of the display device from the vertex of the helmet and the interpupillary distance. The translational travel of these adjustments is from 1 to 3 centimeters. By way of example, as can be seen in FIGS. 2 and 3, it is possible to use a stop 31a that slides in an oblong window in order to perform vertical adjustment. In these figures, horizontal adjustment is performed by means of a knurled screw 31b which bears on a plane. Other adjustment means are possible.

The binoculars may be day-vision binoculars or night-vision binoculars. When the binoculars are day-vision binoculars, they have a magnification other than 1. In what follows and by way of non-limiting example, it is considered that the binoculars are night-vision binoculars with a light intensifier. Their magnification is generally 1.

Figure 4:
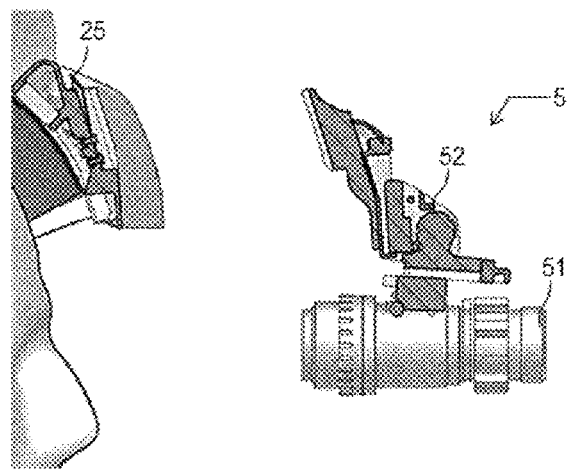
FIG. 4 shows a side view of part of the display system according to the invention with its binoculars.

In the case of FIG. 4, the binoculars are night-vision binoculars. The detachable binoculars 5 comprise two identical bodies 51 providing light amplification, adjustment means and a holder 52 for attachment to the mechanical arch 2.

Each binocular body 51 comprises, in this order, a lens, a device for amplifying the light of the image given by the lens and an eyepiece forming an image at infinity of the intensified image.

When the binoculars 5 are mounted on the arch 2, it is essential that the pupils of the eyepieces are centered on the pupils of the pilot's eyes to the greatest possible degree. Taking account of the morphological differences between different users, adjustments are needed to obtain this result. Binoculars generally comprise four axes for adjustment which are vertical adjustment, lateral adjustment, longitudinal adjustment and angular adjustment.

The travel for vertical adjustment is generally about 30 millimeters, the travel for lateral adjustment or interpupillary distance is generally greater than 20 millimeters, the travel for longitudinal adjustment is generally greater than 25 millimeters and the angular adjustment in the vertical plane is generally of the order of plus or minus 10°.

The display system is essentially modular. It comprises four possible combinations of the different devices described above.

The first combination comprises only the helmet and its visor. In this case, a mechanical cover 4 is mounted in place of the display device as seen in FIG. 2. The cover comprises a planar horizontal part 41, the shape of which is designed so as to hide the upper part of the helmet. This cover comprises a dovetail tenon 22c identical to that of the display device and which is mounted within the part 22a of the dovetail situated on the arch. This prevents stray light from reaching the user's eye.

Figure 5:
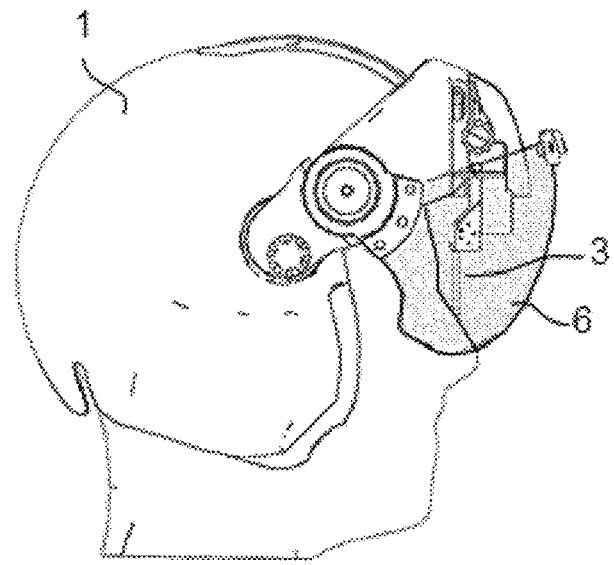
FIG. 5 shows a side view of the display system according to the invention bearing the display device, visor down.

The second combination brings together the helmet, its visor and the display device. In this configuration, it is possible to lower the visor in front of the display device as seen in FIG. 5 which shows a side view of the display system bearing the display device 3.

Figure 6:
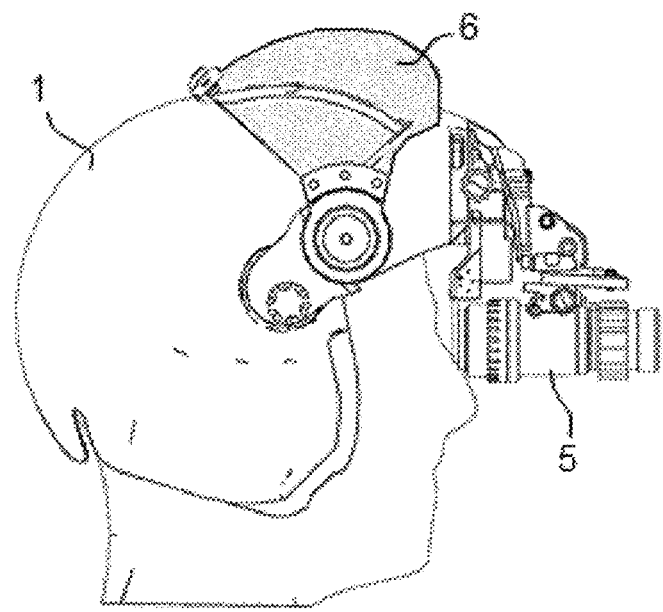
FIG. 6 shows a side view of the display system according to the invention bearing the binoculars, visor up.

The third configuration comprises the helmet, the visor and the binoculars. In this configuration, the visor is necessarily in the up position on top of the helmet as seen in FIG. 6 which shows a side view of the display system bearing the binoculars 5.

The fourth configuration comprises the helmet, the visor, the display device and the binoculars. In this configuration, the visor is necessarily in the up position on top of the helmet. The combiner of the display device is then flat against one of the two eyepieces of the binoculars. The various adjustments are used to perform this function.

The invention claimed is:

1. A modular helmet-mounted display system comprising at least one helmet shell, binoculars and a display device, the modular display system further comprising a mechanical arch for a frontal part of said at least one helmet shell, said mechanical arch comprising at least a binocular attaching device for attaching binoculars, said mechanical arch further comprising a display device attaching device for attaching the display device, wherein the modular display system further comprises a mechanical cover attachable on the display device attaching device when the display device is not attached on the display device attaching device, a shape of a horizontal part of the mechanical cover hides an upper part of the mechanical arch, and the mechanical cover prevents stray light from reaching a user's eyes.

2. The modular helmet-mounted display system as claimed in claim 1, wherein the display device comprises a posture detection device.

3. The modular helmet-mounted display system as claimed in claim 2, wherein the posture detection device comprises a camera.

4. The modular helmet-mounted display system as claimed in claim 1, wherein the display device comprises position adjustments in two perpendicular planes so as to adjust the distance separating the pupil of the display device from the vertex of the at least one helmet shell and the interpupillary distance.

5. The modular helmet-mounted display system as claimed in claim 1, wherein the display device comprises a flat pupil-expansion optical combiner so that the display device and the binoculars may be mounted simultaneously on the at least one helmet shell, the optical combiner being placed flat in front of one of two eyepieces of the binoculars.

6. The modular helmet-mounted display system as claimed in claim 1, wherein the display device attaching device comprises a slide in the shape of a dovetail.

7. The modular helmet with a display system as claimed in claim 1, wherein the display system comprises a movable visor on the mechanical arch.

8. The modular helmet with a display system as claimed in claim 7, wherein the movable visor comprises two axes of rotation situated symmetrically on either side of the mechanical arch and at the height of the user's forehead, said visor having the following two main positions:
   a down position of use, applied when the binoculars are not attached to the binocular attaching device, with the visor covering the display device and a combiner of the display device;
   an up position of use, applied when the binoculars are attached to the binocular attaching device, and in this up position, the visor is situated on top of the at least one helmet shell.

9. The helmet-mounted display system as claimed in claim 1, wherein the mechanical arch is attached to the at least one helmet shell by means of two attachment assemblies situated symmetrically on either side of the helmet shell, each attachment assembly comprising a spacer a thickness of the spacer being matched to a size of the helmet shell, the at least one helmet shell being provided in various sizes, the mechanical arch being of one size.

10. A modular helmet-mounted display system comprising at least one helmet shell, binoculars and a display device, the helmet shell display system further comprising a mechanical arch for a frontal part of said at least one helmet shell, said mechanical arch comprising at least a binocular attaching device for attaching binoculars, said mechanical arch further comprising a display device attaching device for attaching the display device, wherein the display device comprises a flat pupil-expansion optical combiner so that the display device and the binoculars may be mounted simultaneously on the at least one helmet shell, the optical combiner being placed flat in front of one of two eyepieces of the binoculars.

11. A modular helmet-mounted display system comprising at least one helmet shell, binoculars and a display device, the helmet shell display system further comprising a mechanical arch for a frontal part of said at least one helmet shell, said mechanical arch comprising at least a binocular attaching device for attaching binoculars, said mechanical arch further comprising a display device attaching device for attaching the display device, wherein the mechanical arch is attached to the at least one helmet shell by means of two attachment assemblies situated symmetrically on either side of the helmet shell, each attachment assembly comprising a spacer a thickness of the spacer being matched to a size of the helmet shell, the at least one helmet shell being provided in various sizes, the mechanical arch being of one size.

* * * * *